United States Patent
Ahn et al.

(10) Patent No.: US 9,450,724 B2
(45) Date of Patent: Sep. 20, 2016

(54) METHOD AND APPARATUS FOR TRANSMITTING SOUNDING REFERENCE SIGNAL

(71) Applicant: LG ELECTRONICS INC., Seoul (KR)

(72) Inventors: Joonkui Ahn, Seoul (KR); Dongyoun Seo, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 14/604,284

(22) Filed: Jan. 23, 2015

(65) Prior Publication Data

US 2015/0215095 A1    Jul. 30, 2015

Related U.S. Application Data

(60) Provisional application No. 61/930,958, filed on Jan. 24, 2014, provisional application No. 62/001,591, filed on May 21, 2014.

(30) Foreign Application Priority Data

Oct. 28, 2014   (KR) .................. 10-2014-0147349

(51) Int. Cl.
*H04W 4/00* (2009.01)
*H04L 5/00* (2006.01)
*H04L 5/14* (2006.01)
*H04W 72/04* (2009.01)

(52) U.S. Cl.
CPC ............. *H04L 5/0048* (2013.01); *H04L 5/14* (2013.01); *H04L 5/0053* (2013.01); *H04W 72/04* (2013.01)

(58) Field of Classification Search
IPC ............... H04W 72/04; H04L 5/0048,5/005, H04L 5/0051, 5/0053, 5/0055, 5/0057, 5/14
See application file for complete search history.

(56) References Cited

U.S. PATENT DOCUMENTS

| | | | |
|---|---|---|---|
| 2012/0170497 A1* | 7/2012 | Zhang ................. | H04W 76/048 370/311 |
| 2013/0058306 A1* | 3/2013 | Noh ...................... | H04L 1/1671 370/329 |
| 2013/0301575 A1* | 11/2013 | Wang .................... | H04L 5/0057 370/329 |
| 2015/0163036 A1* | 6/2015 | Thomas ................ | H04L 5/0044 370/281 |

FOREIGN PATENT DOCUMENTS

| | | |
|---|---|---|
| KR | 10-2011-0126034 A | 11/2011 |
| KR | 10-2013-0127036 A | 11/2013 |
| WO | WO 2011/100466 A2 | 8/2011 |
| WO | WO 2012/023839 A2 | 2/2012 |

* cited by examiner

Primary Examiner — Jutai Kao
(74) Attorney, Agent, or Firm — Birch, Stewart, Kolasch & Birch, LLP (57) ABSTRACT

A method for transmitting a sounding reference signal (SRS) in a wireless communication system is provided. A user equipment receives downlink control information from a first serving cell and transmits a SRS through a second serving cell. If the first serving cell is a FDD cell and the second serving cell is a TDD cell, the downlink control information includes an aperiodic SRS request. If the first serving cell is the TDD cell and the second serving cell is the FDD cell, the downlink control information does not include the aperiodic SRS request.

12 Claims, 5 Drawing Sheets

METHOD AND APPARATUS FOR TRANSMITTING SOUNDING REFERENCE SIGNAL

CROSS-REFERENCE TO RELATED APPLICATIONS

This application claims the benefit of priority of U.S. Provisional applications 61/930,958 filed on Jan. 24, 2014 and 62/001,591 filed on May 21, 2014, and Korean Patent Application No. 10-2014-0147349 filed on Oct. 28, 2014, all of which are incorporated by reference in their entirety herein.

BACKGROUND OF THE INVENTION

1. Field of the Invention

The present invention relates to a wireless communication, and more particularly, to a sounding reference signal transmission performed by a wireless device to which a plurality of serving cells are configured.

2. Related Art

In a wireless communication system, a duplex scheme includes a time division duplex (TDD) and a frequency division duplex (FDD). The TDD provides an uplink communication and a downlink communication in the same frequency band. The FDD provides the uplink communication and the downlink communication in different frequency bands.

A carrier aggregation is a technique capable of providing a plurality of component carriers to a user equipment. Each component carrier may be defined as one cell. When the plurality of component carriers are configured to the user equipment, it can be regarded that the user equipment receives services from a plurality of serving cells.

Each serving cell may be configured with the FDD or the TDD. In a carrier aggregation environment, the user equipment may be configured with a plurality of duplex schemes. For example, if two cells are configured to the user equipment, the cells may be configured as a TDD cell-TDD cell or a TDD cell-FDD cell. Accordingly, a throughput of the user equipment can be increased in various network environments.

The conventional uplink signal transmission does not consider an environment in which a plurality of serving cells using different duplex schemes are configured.

SUMMARY OF THE INVENTION

The present invention provides a method of transmitting a sounding reference signal by a wireless device to which a plurality of serving cells using different duplex schemes are configured.

In an aspect, a method for transmitting a sounding reference signal (SRS) in a wireless communication system is provided. The method is performed by a user equipment that is configured with a plurality of serving cells including a time division duplex (TDD) cell and a frequency division duplex (FDD) cell. The method includes receiving downlink control information from a first serving cell of the plurality of serving cells, the downlink control information including a carrier indicator and a downlink assignment, the carrier indicator indicating a second serving cell of the plurality of serving cells, the downlink assignment indicating a downlink resource assignment at the second serving cell, and transmitting a SRS through the second serving cell if the downlink control information includes the aperiodic SRS request and the aperiodic SRS request indicates a triggering of a SRS transmission.

If the first serving cell is the FDD cell and the second serving cell is the TDD cell, the downlink control information may include the aperiodic SRS request. If the first serving cell is the TDD cell and the second serving cell is the FDD cell, the downlink control information may not include the aperiodic SRS request.

The first serving cell may be a primary cell and the second serving cell may be a secondary cell.

In another aspect, a device configured to transmit a sounding reference signal (SRS) in a wireless communication system and configured with a plurality of serving cells including a time division duplex (TDD) cell and a frequency division duplex (FDD) cell is provided. The device includes a radio frequency (RF) unit configured to receive and transmit radio signals; and a processor operatively coupled with the RF unit and configured to instruct the RF unit to receive downlink control information from a first serving cell of the plurality of serving cells, the downlink control information including a carrier indicator and a downlink assignment, the carrier indicator indicating a second serving cell of the plurality of serving cells, the downlink assignment indicating a downlink resource assignment at the second serving cell, and instruct the RF unit to transmit a SRS through the second serving cell if the downlink control information includes the aperiodic SRS request and the aperiodic SRS request indicates a triggering of a SRS transmission.

When a plurality of serving cells having different duplex schemes are configured, an uplink channel estimation can be improved by using a sounding reference signal.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device and may be referred to as another terminology, such as an evolved node-B (eNB), a base transceiver system (BTS), an access point, etc.

Hereinafter, the present invention is applied based on a 3rd generation partnership project (3GPP) long term evolution (LTE) or a 3GPP LTE-Advanced (LTE-A). This is for exemplary purposes only, and thus the present invention is applicable to various communication systems.

A wireless device may be served by a plurality of serving cells. Each serving cell may be defined with a downlink (DL) component carrier (CC) or a pair of a DL CC and an uplink (UL) CC.

Each serving cell may be configured as a time division duplex (TDD) or a frequency division duplex (FDD). A TDD cell is a cell configured to the TDD. A FDD cell is a cell configured to the FDD.

A serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
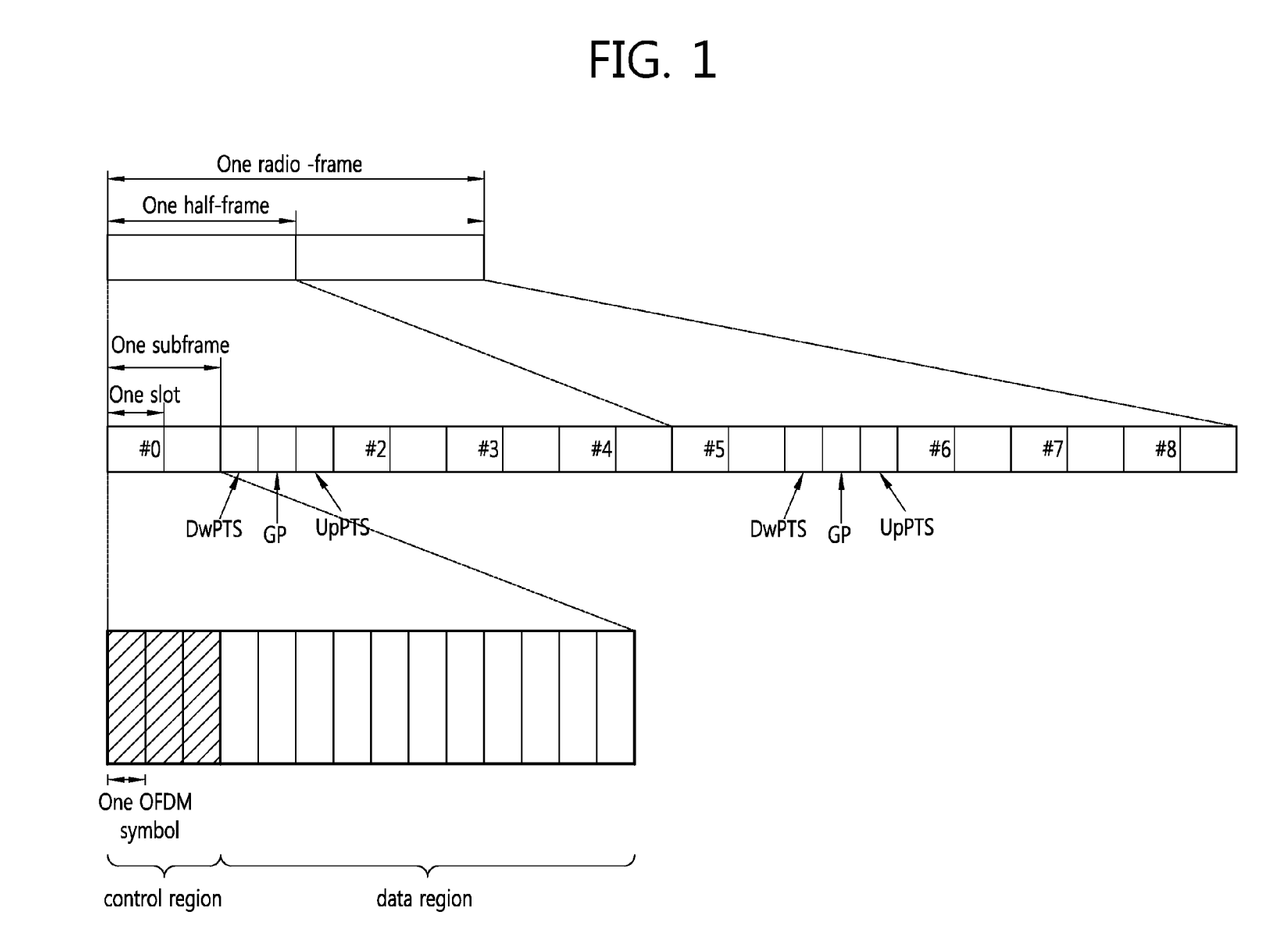
FIG. 1 shows a structure of a downlink (DL) radio frame in 3rd generation partnership project (3GPP) long term evolution (LTE)/LTE-advanced (LTE-A).

FIG. 1 shows a downlink radio frame structure in 3GPP LTE/LTE-A.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A special (S) subframe is a unique kind of subframe used for the TDD. A subframe having an index #1 and an index #6 is called a S subframe. The S subframe includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe may be divided into a control region and a data region in the time domain. The control region includes up to first four OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

Hereinafter, DL control channels are disclosed.

Examples of physical control channels in 3GPP LTE/LTE-A include a physical downlink control channel (PDCCH), a physical control format indicator channel (PCFICH) and a physical hybrid-ARQ indicator channel (PHICH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

In 3GPP LTE/LTE-A, blind decoding is used to detect a PDCCH. Blind decoding is a scheme in which a desired identifier is demasked to a received PDCCH (this is called candidate PDCCH) and a CRC error is checked to thereby verify whether the PDCCH is its own control channel.

A base station determines a PDCCH format depending on a DCI that is to be sent to the wireless device, adds a CRC (cyclic redundancy check) to the DCI, and masks to the CRC a unique identifier (this is called RNTI (radio network temporary identifier) depending on the owner or purpose of the PDCCH.

A search space is used to lessen burden due to blind decoding. The search space may be a CCE's monitoring set for the PDCCH. The wireless device monitors the PDCCH in the corresponding search space.

Search spaces are divided into a common search space and a UE-specific search space. The common search space is a space for searching a PDCCH having common control information and consists of 16 CCEs indexed 0 to 15 while supporting a PDCCH having a CCE aggregation level of {4, 8}. However, a PDCCH (DCI format 0, 1A) conveying UE-specific information may also be monitored in the common search space. The UE-specific search space supports a PDCCH having a CCE aggregation level of {1, 2, 4, 8}.

Figure 2:
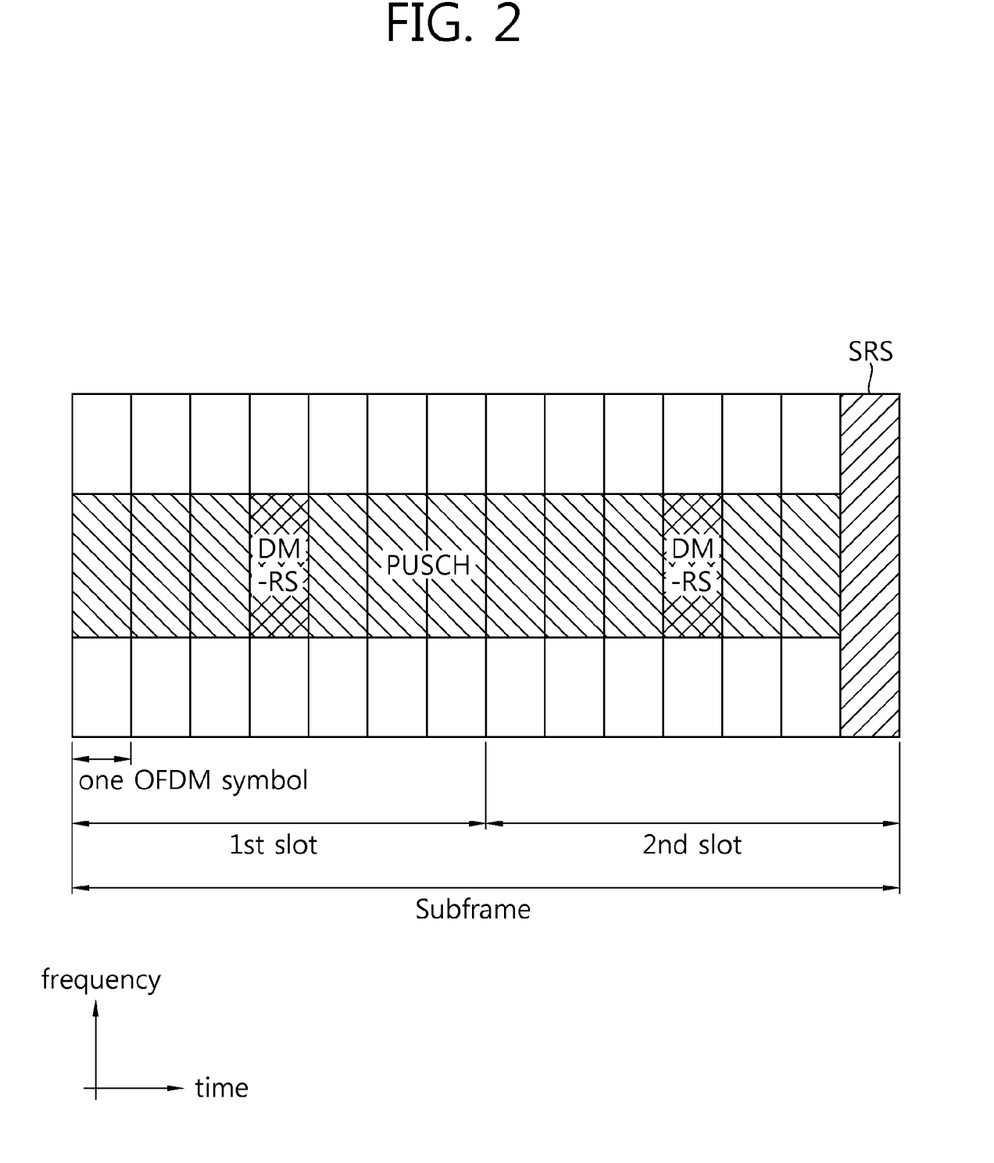
FIG. 2 shows an example of an uplink (UL) subframe.

FIG. 2 shows an example of a UL subframe. The number of OFDM symbols included in the subframe and an arrangement of each UL channel are for exemplary purposes only.

UL channels include a Physical Uplink Shared Channel (PUSCH), a Physical Uplink Control Channel (PUCCH), a sounding reference signal (SRS), and a physical random access channel (PRACH).

The PUSCH may be allocated by a UL grant on a PDCCH, and is used to carry user traffic. When the PUSCH is transmitted, a demodulation reference signal (DM RS) for PUSCH demodulation is transmitted in a 4th OFDM symbol of each slot. The PUCCH is used to carry a control signal such as CQI and ACK/NACK for HARQ.

The SRS is a signal used by a BS to estimate a state of the UL channel.

The SRS transmission can be classified into a periodic SRS transmission and an aperiodic SRS transmission. The periodic SRS transmission occurs in a subframe triggered by a periodic SRS configuration. The periodic SRS configuration includes an SRS periodicity and an SRS subframe offset. If the periodic SRS configuration is given, a UE can periodically transmit an SRS in a subframe satisfying the periodic SRS configuration.

In the aperiodic SRS transmission, the SRS is transmitted upon detection of an SRS request of a BS. For the aperiodic SRS transmission, the SRS configuration is given. The SRS configuration also includes an SRS periodicity $T_{SRS}$ and an SRS subframe offset $T_{offset}$.

The SRS request for triggering of the aperiodic SRS transmission may be included in a DL grant or a UL grant on a PDCCH. For example, if the SRS request has 1 bit, '0' may indicate a negative SRS request, and '1' may indicate a positive SRS request. If the SRS request has 2 bits, '00' may indicate a negative SRS request, and the others may indicate a positive SRS request. In this case, one of a plurality of SRS configurations for SRS transmission can be selected.

Assume that a positive SRS request is detected in a subframe n of a serving cell. Upon detection of the positive SRS request, an SRS is transmitted in a first subframe satisfying a condition of n+k where k≥4 as well as $T_{SRS}>2$ in TDD and $(10*nf+k_{SRS}-T_{offset})$ mod $T_{SRS}=0$ in FDD. In FDD, a subframe index $k_{SRS}$ is {0, 1, ..., 9} in a frame nf. In TDD, $k_{SRS}$ is defined by a predetermined table. In TDD of $T_{SRS}=2$, the SRS is transmitted in a first subframe satisfying a condition of $(k_{SRS}-T_{offset})$mod 5=0.

Hereinafter, a subframe in which the SRS is transmitted is called an SRS subframe or a triggered subframe. In periodic SRS transmission and aperiodic SRS transmission, the SRS can be determined in an SRS subframe determined UE-specifically.

An OFDM symbol in which the SRS is transmitted may have a fixed position in the SRS subframe. For example, the SRS may be transmitted in a last OFDM symbol of the SRS subframe. The OFDM symbol in which the SRS is transmitted is called a sounding reference symbol.

Now, an UL signal transmission proposed in a carrier aggregation (CA) environment in which a plurality of serving cells are configured is described.

Figure 3:
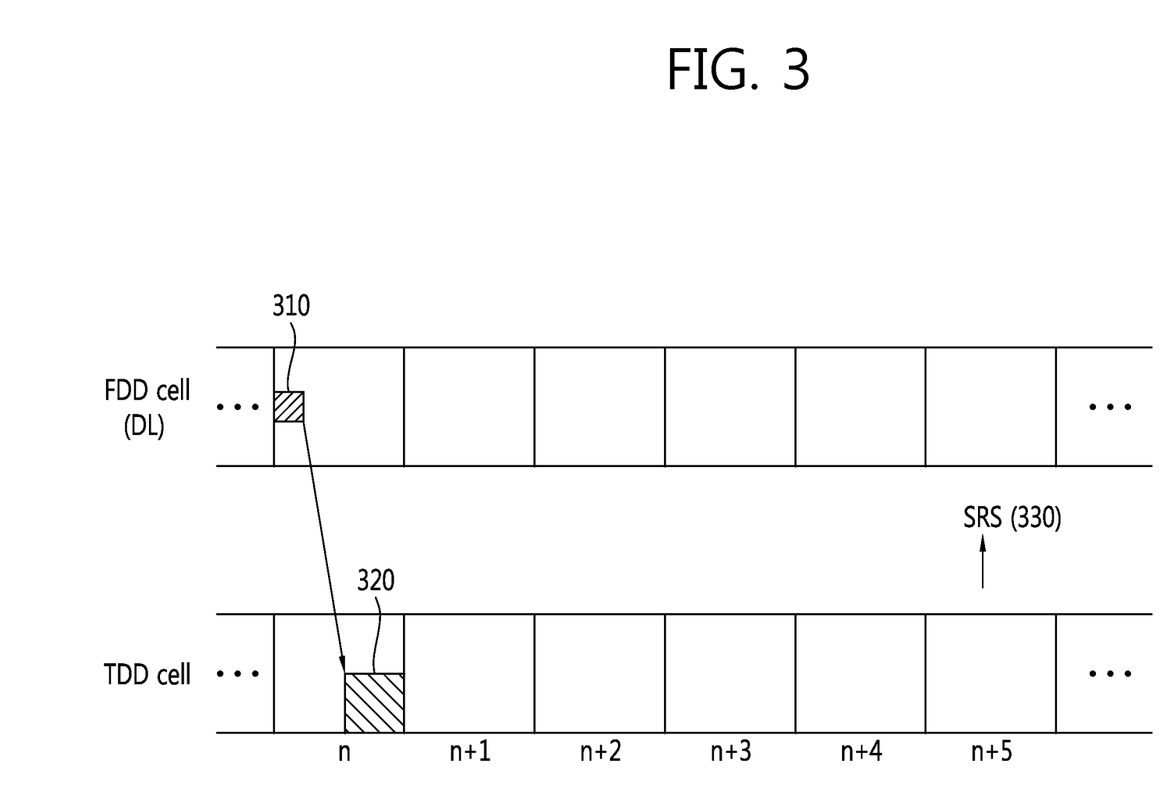
FIG. 3 shows an example in which a plurality of serving cells are configured.

FIG. 3 shows an example in which a plurality of serving cells are configured.

It is assumed that an FDD cell and a TDD cell are configured to a wireless device, and the FDD cell is a primary cell and the TDD cell is a secondary cell. It is also assumed that the TDD cell is activated by signaling of the FDD cell. The number of configured cells is for exemplary purposes only.

A method of scheduling a plurality of serving cells includes non cross-carrier scheduling and cross-carrier scheduling. In the non cross-carrier scheduling, a scheduled cell is identical to a scheduling cell. In the cross-carrier scheduling, the scheduled cell is different from the scheduling cell. The scheduling cell is a cell in which a scheduling signal is received, that is, a cell in which a PDCCH is monitored, and is also called a monitoring cell. The scheduled cell is a cell in which a PDSCH scheduled by a PDCCH is received (or in which a PDSCH is transmitted).

FIG. 3 shows an example of cross-carrier scheduling. An FDD cell is a scheduling cell, and a TDD cell is a scheduled cell. It is assumed that a subframe n is a special (S) subframe or a downlink (DL) subframe in the TDD cell. A wireless device receives downlink control information (DCI) on a PDCCH 310 in the subframe n of the FDD cell, and receives DL data on a PDSCH 320 of the TDD cell indicated by the DCI.

Whether to perform the cross-carrier scheduling may be given to the wireless device by signaling of a primary cell. If the cross-carrier scheduling is possible, the DCI may include a carrier indicator field (CIF) in addition to a DL resource allocation for the PDSCH. The CIF may indicate an index of a scheduled cell.

Meanwhile, as described above, the DCI may include a SRS request for triggering an aperiodic SRS transmission. This is to confirm a UL channel state of the wireless device by a serving cell even at a time in which a periodic SRS transmission is not achieved.

It is assumed that the SRS request in the DCI on the PDCCH 310 triggers a SRS transmission. It is also assumed that a subframe n+5 is a SRS subframe which satisfies an aperiodic SRS transmission configuration. The wireless device transmits a SRS 330 in the subframe n+5 of a TDD cell.

Figure 4:
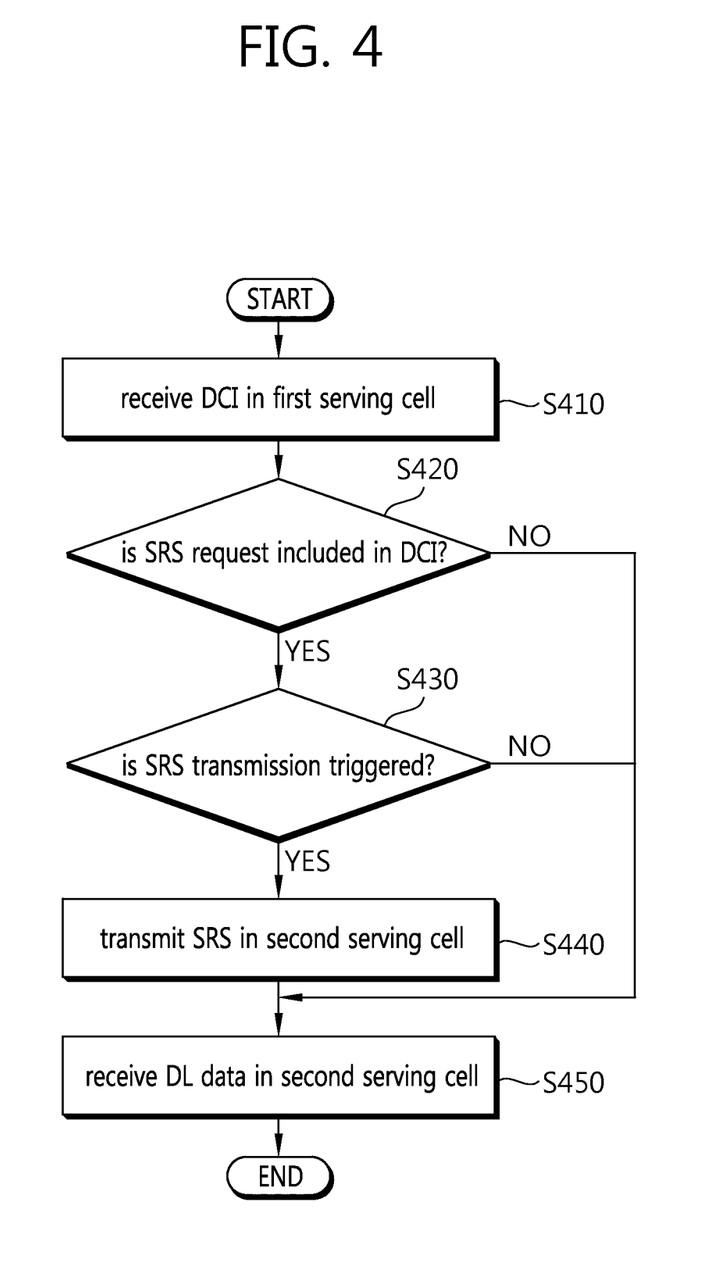
FIG. 4 is a flowchart showing a sounding reference signal (SRS) transmission according to an embodiment of the present invention.

FIG. 4 is a flowchart showing a SRS transmission according to an embodiment of the present invention. It is assumed that a TDD cell and an FDD cell are configured to a wireless device.

In step S410, the wireless device receives DCI from a first serving cell (i.e., a scheduling cell). The DCI may be received on a PDCCH of the first serving cell. The DCI may include a CFI indicating a second serving cell (i.e., a scheduled cell) and a DL resource allocation.

In step S420, the wireless device determines whether the SRS request is included in the DCI. The wireless device may determine whether the SRS request is included in the DCI according to a duplex scheme of the first serving cell and the second serving cell.

Irrespective of the duplex scheme of the first serving cell, the wireless device may determine that the SRS request is included in the DCI if the second serving cell is a TDD cell. If the second serving cell is not the TDD cell, the wireless device may determine that the SRS request is not included in the DCI. More specifically, if the first serving cell is an FDD cell and the second serving cell is the TDD cell, the wireless device may determine that the SRS request is included in the DCI. If the first serving cell is the TDD cell and the second serving cell is the FDD cell, the wireless device may determine that the SRS request is not included in the DCI.

In step S430, if it is determined that the SRS request is included in the DCI, it is determined whether the SRS request triggers a SRS transmission.

The SRS request may be fixed to a size of one bit. For example, if the SRS request has a value of '1', the SRS transmission is requested, and if the SRS request has a value of '0', the SRS transmission is not requested.

If the SRS transmission is triggered, in step S440, the wireless device transmits a SRS in a SRS subframe. Before that, the wireless device may receive an aperiodic SRS configuration for determining the SRS subframe from a BS.

In step S450, the wireless device receives DL data on a PDSCH on the DCI. If the DCI is received in a subframe n, the DL data is also received in the subframe n. On the other hand, the SRS is transmitted in a subframe n+k (k>1). This step may be performed before the step S420, or may be performed simultaneously with the step S420.

When whether the SRS request is included in the DCI having a DL allocation (this is called DL scheduling DCI) is determined according to the duplex scheme of the serving cell, the following advantages are provided:

First, in a TDD cell, a DL/UL transmission is divided in a time duration and thus a transmission opportunity is relatively small in comparison with the FDD cell. Therefore, it is not easy to distribute a periodic SRS to all wireless devices in a cell while avoiding a collision. Accordingly, a method in which the SRS is transmitted only when necessary such as in an aperiodic SRS may be effective in the TDD cell.

Second, in the TDD cell, the same frequency carrier is used in a DL transmission and a UL transmission, and thus a similarity of a DL channel and a UL channel exists. Accordingly, a SRS may be used to measure DL channel quality for DL scheduling. In a case where DL scheduling is relatively more frequent than UL scheduling in a specific device, it may be effective that a request of a SRS transmission is allowed to estimate DL channel quality for the DL scheduling.

Third, in the TDD cell, a UL transmission opportunity is relatively smaller than the FDD cell, and thus an opportunity for transmitting DCI having a UL grant is decreased. Therefore, even if the UL scheduling is not performed, it is necessary to trigger an aperiodic SRS transmission through the DCI.

A configuration regarding whether to determine whether a SRS request is included in DL DCI for scheduling the TDD cell may be given by RRC signaling. When the configuration is activated, the decision of the step S420 may be performed.

In order to increase an opportunity capable of triggering the aperiodic SRS, if a DL scheduled cell is the TDD cell or a UL scheduling cell is the TDD cell, the DCI may be allowed to include the aperiodic SRS. This is because if a cell for transmitting the SRS is the TDD cell or if a cell for transmitting DCI having a UL grant is the TDD cell, an opportunity capable of transmitting the UL grant may be relatively insufficient.

Meanwhile, as to the FDD cell, instead of allowing a UL transmission in all UL subframes of a UL carrier, it may also be restricted such that the UL transmission is scheduled only in some UL subframes. For example, it may be restricted such that some of UL subframes of the FDD cell are changed to be used in a DL transmission in order to support more DL traffics or that some of UL subframes are not used in the UL transmission in order to regulate an inter-cell interference. In this case, an aperiodic SRS request may be included in DL scheduling DCI for the FDD cell. Whether the aperiodic SRS request is included in the DL scheduling DCI for scheduling the FDD cell may be given by RRC signaling.

Hereinafter, a collision of an UpPTS and/or a PUCCH in a SRS transmission is described.

When a plurality of serving cells are configured to a wireless device, a PUCCH transmission of a first serving cell and a SRS transmission of a second serving cell may overlap in the same subframe. In this case, the SRS transmission is discarded in a corresponding subframe, and only a PUCCH is transmitted. This is to decrease a peak-to-average power ratio (PAPR). Alternatively, if a shortened PUCCH is configured, since a SRS symbol and the PUCCH do not overlap in a corresponding subframe, both of a PUCCH of the first serving cell and a SRS of the second serving cell may be transmitted.

When a TDD cell and an FDD cell are configured to the wireless device, it may be configured such that a periodic SRS is transmitted by using an UpPTS of an S subframe of the TDD cell. In this case, a PUCCH transmission of the FDD cell and a SRS transmission in an UpPTS of the TDD cell may collide in one subframe. If the UpPTS consists of last 2 OFDM symbols of the S subframe and if it is configured to transmit a SRS in both of the 2 OFDM symbols, a PUCCH transmission is allowed to overlap in one of the two OFDM symbols for the UpPTS even if the shortened PUCCH is applied. When such a collision occurs, the following methods are proposed to avoid an increase in a PAPR.

In a first embodiment, if it is configured to transmit a SRS by using an UpPTS, a shortened PUCCH is not configured. That is, the SRS transmission may be discarded.

In a second embodiment, when a shortened PUCCH is applied, it is not configured to transmit a SRS in an OFDM symbol for an UpPTS. When the shortened PUCCH is applied, it is not allowed to transmit the SRS in the OFDM symbol for the UpPTS.

In a third embodiment, in case of an FDD-TDD cell aggregation, if it is configured to transmit a PUCCH to an FDD cell, it is not configured to transmit a SRS by using an UpPTS of a TDD cell. This is a case where the FDD cell is a primary cell.

The above operation may be understood not only from a perspective of a network configuration but also from a perspective of not expecting a corresponding configuration by the wireless device.

The above operation may apply not only to a case where an SRS is transmitted in 2 OFDM symbols of an UpPTS or a case where the SRS is transmitted in a first OFDM symbol of the UpPTS but also to all cases of being configured to transmit the SRS by using the UpPTS.

The above operation may apply not only to a periodic SRS but also to an aperiodic SRS.

Figure 5:
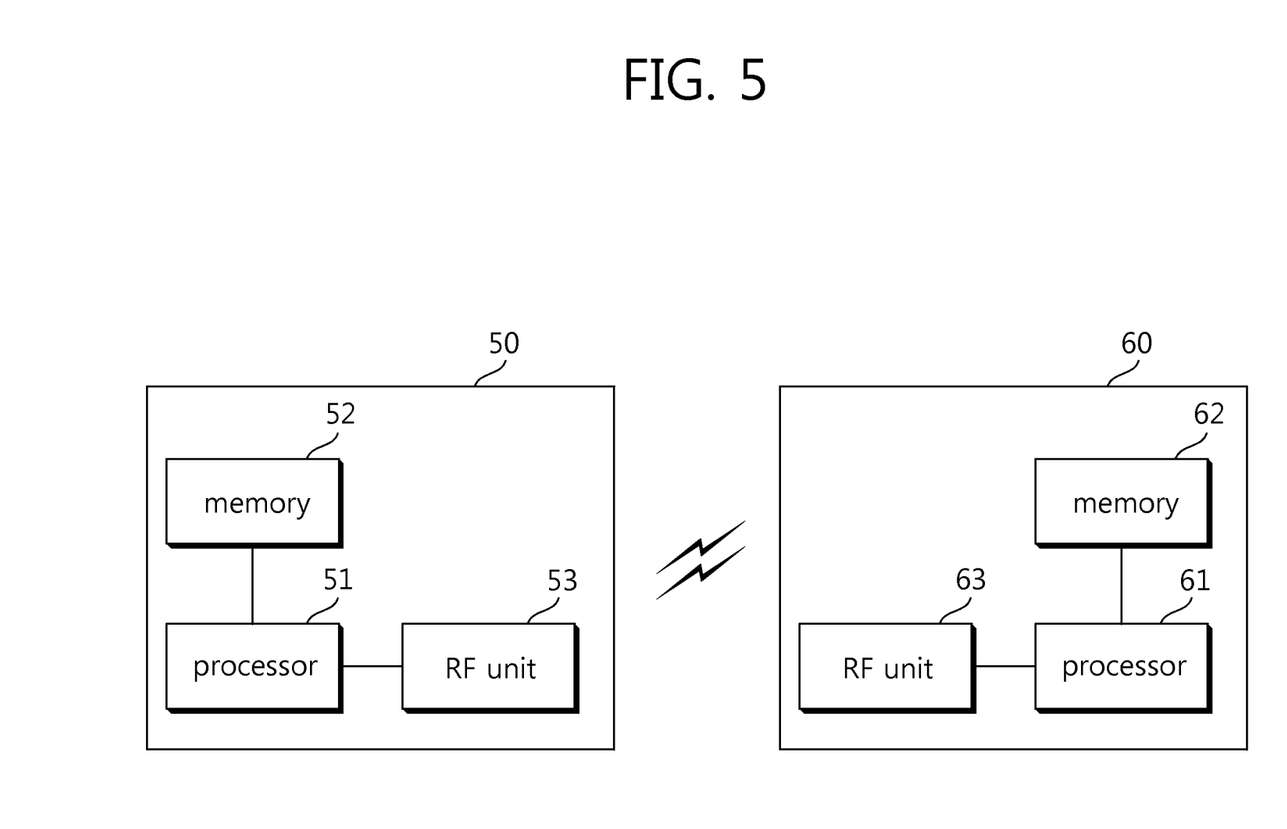
FIG. 5 is a block diagram showing a wireless communication system according to an embodiment of the present invention.

FIG. 5 is a block diagram showing a wireless communication system according to an embodiment of the present invention.

A BS 50 includes a processor 51, a memory 52, and a radio frequency (RF) unit 53. The memory 52 coupled to the processor 51 is driven by the processor 51, and stores various instructions for performing an operation of the BS 50. The RF unit 53 is coupled to the processor 51, and transmits and/or receives a radio signal. The processor 51 implements the proposed functions, procedures, and/or methods. In the aforementioned embodiment, a plurality of serving cells may be controlled/managed by the BS 50, and an operation of one or more cells may be implemented by the processor 51.

A wireless device 60 includes a processor 61, a memory 62, and an RF unit 63. The memory 62 is coupled to the processor 61, and stores various instructions for performing an operation of the wireless device 60. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a sounding reference signal (SRS) in a wireless communication system, performed by a user equipment that is configured with a plurality of serving cells including a time division duplex (TDD) cell and a frequency division duplex (FDD) cell, the method comprising:

receiving downlink control information from a first serving cell of the plurality of serving cells, the downlink control information including a carrier indicator and a downlink assignment, the carrier indicator indicating a second serving cell of the plurality of serving cells, the downlink assignment indicating a downlink resource assignment at the second serving cell; and transmitting an SRS through the second serving cell if the downlink control information includes an aperiodic SRS request that indicates a triggering of an SRS transmission, wherein:

if the first serving cell is the FDD cell and the second serving cell is the TDD cell, the downlink control information includes the aperiodic SRS request, and if the first serving cell is the TDD cell and the second serving cell is the FDD cell, the downlink control information does not include the aperiodic SRS request.

2. The method of claim 1, further comprising:
determining whether the downlink control information further includes the aperiodic SRS request.

3. The method of claim 1, wherein the aperiodic SRS request has one bit.

4. The method of claim 3, wherein, when the aperiodic SRS request is set to one, the aperiodic SRS request indicates the triggering of the SRS transmission.

5. The method of claim 1, wherein the first serving cell is a primary cell and the second serving cell is a secondary cell.

6. The method of claim 1, wherein the downlink control information is received on a physical downlink control channel (PDCCH) of the first serving cell.

7. The method of claim 1, further comprising:
receiving downlink data from the second serving cell based on the downlink resource assignment.

8. The method of claim 1, further comprising:
receiving an SRS configuration for the SRS transmission, the SRS configuration including a bandwidth of the SRS and a subframe offset of the SRS.

9. A device configured to transmit a sounding reference signal (SRS) in a wireless communication system and configured with a plurality of serving cells including a time division duplex (TDD) cell and a frequency division duplex (FDD) cell, the device comprising:

a radio frequency (RF) unit configured to receive and transmit radio signals; and a processor operatively coupled with the RF unit and configured to:

instruct the RF unit to receive downlink control information from a first serving cell of the plurality of serving cells, the downlink control information including a carrier indicator and a downlink assignment, the carrier indicator indicating a second serving cell of the plurality of serving cells, the downlink assignment indicating a downlink resource assignment at the second serving cell; and instruct the RF unit to transmit an SRS through the second serving cell if the downlink control information includes an aperiodic SRS request that indicates a triggering of an SRS transmission, wherein:

if the first serving cell is the FDD cell and the second serving cell is the TDD cell, the downlink control information includes the aperiodic SRS request, and if the first serving cell is the TDD cell and the second serving cell is the FDD cell, the downlink control information does not include the aperiodic SRS request.

10. The device of claim 9, wherein the aperiodic SRS request has one bit.

11. The device of claim 10, wherein, when the aperiodic SRS request is set to one, the aperiodic SRS request indicates the triggering of the SRS transmission.

12. The device of claim 9, wherein the first serving cell is a primary cell and the second serving cell is a secondary cell.

* * * * *